(12) United States Patent
Kim

(10) Patent No.: US 8,939,169 B2
(45) Date of Patent: Jan. 27, 2015

(54) UNPOWERED APPARATUS FOR PREVENTING BACKFLOW

(76) Inventor: Jong Sun Kim, Bucheon-si (KR)

(*) Notice: Subject to any disclaimer, the term of this patent is extended or adjusted under 35 U.S.C. 154(b) by 0 days.

(21) Appl. No.: 13/519,026

(22) PCT Filed: Dec. 23, 2010

(86) PCT No.: PCT/KR2010/009283
§ 371 (c)(1),
(2), (4) Date: Jun. 25, 2012

(87) PCT Pub. No.: WO2011/078604
PCT Pub. Date: Jun. 30, 2011

(65) Prior Publication Data
US 2012/0279586 A1 Nov. 8, 2012

(30) Foreign Application Priority Data

Dec. 23, 2009 (KR) .................. 10-2009-0129993

(51) Int. Cl.
*F16K 15/03* (2006.01)
*E03F 7/04* (2006.01)
*F16K 31/22* (2006.01)
(52) U.S. Cl.
CPC . *F16K 15/03* (2013.01); *E03F 7/04* (2013.01); *F16K 31/22* (2013.01)
USPC .......................................... 137/527; 137/409
(58) Field of Classification Search
USPC ........ 137/527, 409, 247.19, 448, 433; 405/96
See application file for complete search history.

(56) References Cited

U.S. PATENT DOCUMENTS

| 714,006 | A | * | 11/1902 | Menard | 137/409 |
| 1,606,396 | A | * | 11/1926 | Blom | 137/409 |
| 4,503,881 | A | * | 3/1985 | Vecchio | 137/425 |

FOREIGN PATENT DOCUMENTS

| JP | 10-252043 | 9/1998 |
| JP | 11-117270 | 4/1999 |

(Continued)

OTHER PUBLICATIONS

International Search Report for PCT/KR2010/009283 Mailed on August 23, 2011.

*Primary Examiner* — Kevin Lee
*Assistant Examiner* — P. Macade Nichols
(74) *Attorney, Agent, or Firm* — AKC Patents, LLC; Aliki K. Collins

(57) ABSTRACT

The present invention relates to an unpowered apparatus for preventing backflow, comprising: a tubular main body having a stepped portion, wherein the main body has an inlet port for the inflow of sewage, an outlet port for discharging the sewage, and a communication port which is inclined toward the outlet port and which puts the inlet port and the outlet port in communication; an opening/shutting door having a door body rotatably hinged to the inside of the main body so as to open/shut the communication port, and a pair of blocking plates extending from either side of the door body so as to block the space between the stepped portion and an inner wall of the main body; a floating part which is arranged in the opening/shutting door, the interior of which is empty such that the floating part can float on a water surface, and which provides the opening/shutting door with buoyancy and operates the opening/shutting door so as to close the communication port when the sewage flows back toward the outlet port; and a guide interposed between the stepped portion and a bottom surface of the main body so as to guide the sewage introduced from the inlet port such that the sewage flows toward the outlet port via the communication port.

6 Claims, 5 Drawing Sheets

(56) References Cited

FOREIGN PATENT DOCUMENTS

| KR | 2002-0057894 | 7/2002 |
| KR | 20-0390630 | 7/2005 |
| KR | 10-0827566 | 5/2008 |
| KR | 10-0887243 | 2/2009 |

\* cited by examiner

UNPOWERED APPARATUS FOR PREVENTING BACKFLOW

RELATED APPLICATIONS

This application is a 371 application of International Application No. PCT/KR2010/009283, filed Dec. 23, 2010, which in turn claims priority from Korean Patent Application No. 10-2009-0129993, filed Dec. 23, 2009, each of which is incorporated herein by reference in its entirety.

TECHNICAL FIELD

The present invention relates to an unpowered apparatus for preventing a backflow, and in particular to an unpowered apparatus for preventing a backflow which is typically installed at an end portion of a drain pipe connected from a drainage well to a sewer pipe or installed at a water gate of an agricultural drainage canal for the purpose of preventing a backflow of sewage.

BACKGROUND ART

Sewage discharged from various drain pipes such as a residential facility, an agricultural facility, a public facility and an industrial facility is collected from a primary drain pipe to a drainage well, a sewer pipe or a sewage main pipe and a branch drain pipe and is directly discharged to a river or sea or sewage is collected in a sewage treatment facility such as a sewage end treatment plant or a sewage disposal plant and is discharged to a river or a public water surface such as sea.

A primary drain pipe or a sewage main pipe and a branch drain pipe generally installed at a sewage treatment plant as such have proper standards for the purpose of enough treating a normal amount of sewage expected in a corresponding facility or a place.

In case of a sewage discharge, a primary drain pipe or a sewage main pipe and a branch drain pipe are designed to discharge sewage in an open water passage type having a free water surface; however if influent exceeds a treatment capacity (discharging capacity) of a drain pipe per hour as heavy rain or concentrated heavy rain falls in some areas, such pipes discharge sewage in a full water state without leaving a free water surface.

So, the influent, which was not discharged through a corresponding drain pipe, overflows over a road or a ground surface, and at the same time, a discharge water pressure of a drain pipe passage rises and flows back toward a primary drain pipe where is lower than other areas, thus consequently flowing back to a drainage part and a water collection tank of a house or a public facility and an industrial facility which are sewage discharge places, thus causing a flooding damage and flooding a road or a water purification tank and other facilities.

In addition, in case that a branch drain pipe becomes a pipe water passage due to heavy fall or concentrated heavy rain in a certain area or the water level of a river sharply rises for a short time, and in case that the water level of a river rises for a long time due to seasonal rain, or in case that the water level of sea rises, the sewage and river water or sea water flow back toward the sewer pipes of a lower area or a branch drain pipe or toward an agricultural passage of a water canal, thus causing a flooding damage.

In recent years, various sewage backflow prevention apparatuses are being developed so as to preventing flooding damages due to the backflows of sewage or river water or sea water. As a sewage backflow prevention apparatus, there is 'Apparatus for preventing reverse flow of drainage' of the Korean patent publication number 10-2008-0078974 (hereinafter referred to the prior art).

The above mentioned prior art comprises a connection pipe connected with a drainpipe depending on the outer diameter of the drain pipe, an opening and closing part which is rotatably installed by a rotary shaft fixed at an inner side of the connection pipe and serves to open and close the pipe passage of the connection pipe, and an opening and closing part engaging shoulder which is disposed at an inner side of the connection pipe and mounts the opening and closing part which has closed the drain pipe.

The opening and closing part usually keeps closing the pipe passage of the connection pipe; however when sewage flows in from the drain pipe via the pipe passage of the connection pipe, the opening and closing part, which is installed to rotate in the direction that the sewage flows in, is open by means of the water pressure of sewage. On the contrary, when sewage flows back, the opening and closing part is closed and supported by the opening and closing part engaging shoulder, thus closing the pipe passage of the connection pipe.

Since the prior art is however characterized in that the opening and closing part is opened only by means of the water pressure of the sewage, when the amount of sewage discharged via the drain pipe is small, the opening and closing part might not be open, which leads to a problem that sewage flows back by means of the opening and closing part which was closed due to the above-mentioned problem.

As the opening and closing part interferes with the flow of sewage, a smooth discharge of sewage is hard, and since the pipe passage of the connection pipe is hard to be formed in a full open type it is almost impossible to discharge a certain object which is bulky and long.

Furthermore, when an impurity such as sand, debris, concomitant, etc. flows in via a gap between an edge portion of the opening and closing part and an inner wall of the connection pipe in a state that the opening and closing part is blocking the pipe passage, such operation might be in the middle of the operation of the opening and closing part as an interfering element, so the opening and closing part might not open.

DISCLOSURE OF INVENTION

Accordingly, the present invention is made to resolve the above-mentioned problems, and it is an object of the present invention to provide an unpowered apparatus with a high water discharge performance for preventing backflow which is characterized in that since an opening and closing door, which opens and closes a pipe passage, is always open, so it is possible to easily drain sewage irrespective of the amount of flowing water, and even when various bulky and long impurities flow in along with sewage, it is possible to easily drain without being blocked.

It is another object of the present invention to provide an unpowered apparatus for preventing backflow which makes it possible to operate with no errors in an opening and closing door in such a way that a gap between a pipe passage and an opening and closing door is blocked so that the operation of the opening and closing door is not interfered as an impurity such as sand, debris, concomitant, etc. is inputted into between a gap between a pipe passage and an opening and closing door along with sewage from a drain pipe.

It is further another object of the present invention to provide an unpowered apparatus for preventing backflow which makes it possible to quickly block a pipe passage in case of a backflow of sewage via a discharge port, and makes it possible to fully open a pipe passage when a backflow problem is resolved.

In addition, it is still further another object of the present invention to provide an unpowered apparatus for preventing backflow the installation of which is easy since it is installed at an end portion of a drain pipe, and the present invention provides a reliable expansion performance which facilitates it to be well applied from a small size to a big size depending on the size of the drain pipe To achieve the above objects, there is provided an unpowered apparatus for preventing a backflow, comprising a tubular body part which includes an inlet port for receiving sewage; an outlet port for discharging sewage; and a shoulder part which is obliquely installed toward the outlet port and as a communication port communicating the inlet port and the outlet port; an opening and closing door which includes a door body which is rotatably hinged at an inner side of the body part and serves to open and close the communication port; and a pair of blocking plates which are extended from both sides of the door body and block between the shoulder part and the inner wall of the body part; a floating part which is provided at the opening and closing door and is formed in a hollow container shape to float on the surface of water and operates the opening and closing door to close the communication port as the opening and closing door has a buoyancy when the sewage flows back toward the outlet port; and a guide which is provided between the shoulder part and a bottom surface of the body part and guides the sewage introduced in from the inlet port to flow toward the outlet port via the communication port.

In addition, it is characterized in that at a circumference of the shoulder part of the body part is provided a packing member which seals between the shoulder part and the opening and closing door.

In addition, it is characterized in that at the floating part is formed a buoyancy detection groove into which the flowing-back sewage flows.

ADVANTAGEOUS EFFECTS

As described above, the unpowered apparatus for preventing backflow according to the present invention is characterized in that the installation of the apparatus is easy because it is installed at an end portion of a drain pipe, and a drainage can be quickly performed without any blockings even when a bulky and long impurity flows in along with sewage from a drain pipe, and a backflow phenomenon of sewage can be prevented in the present invention in such a way that an opening and closing door, which opens and closes a pipe passage in case of a backflow of sewage, quickly closes a pipe passage as it operates by mean of buoyancy.

In addition, the present invention helps enhance the performance of preventing backflow since an error operation does not occur in the opening and closing door in such a way that a gap formed between a pipe passage and an opening and closing door is blocked so that an impurity such as sand, debris, concomitant, etc. flowing in along with sewage from a drain pipe cannot interfere with the operation of the opening and closing door.

Figure 1:
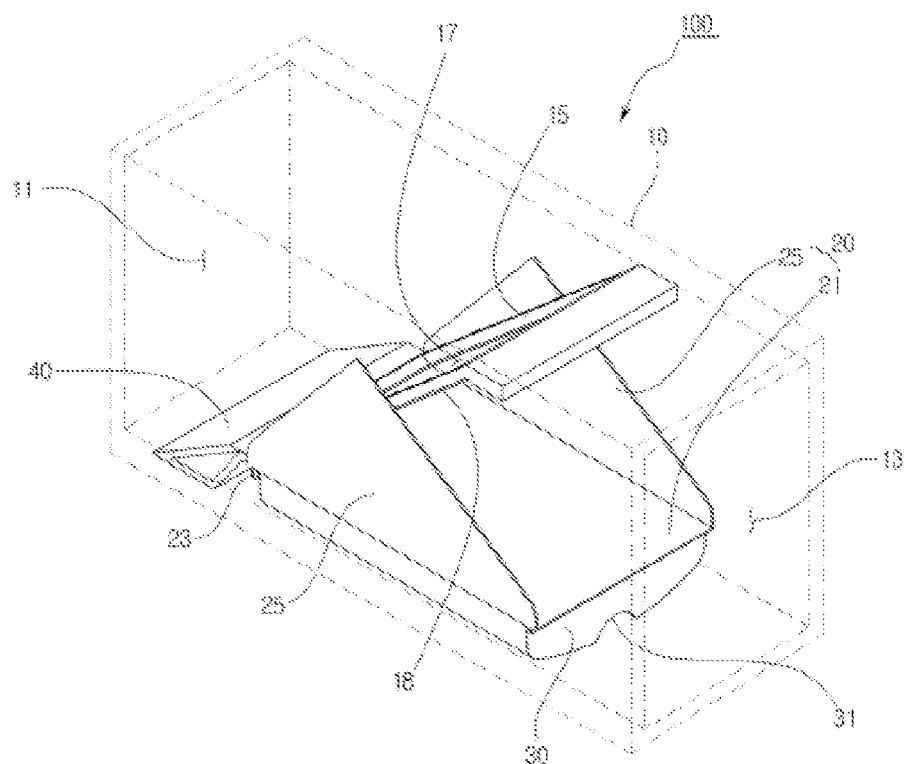
FIG. 1 is a perspective view illustrating a construction of an unpowered apparatus for preventing backflow according to the present invention.

<Descriptions of the reference numerals of key elements of the drawings>

| | |
|---|---|
| 10: body part | 11: inlet port |
| 13: outlet port | 15: shoulder part |
| 17: communication port | 18: packing member |
| 20: opening and closing door | 21: door body |
| 25: blocking plate | 30: floating part |
| 31: buoyancy detection groove | 40: guide |
| 50: drain pipe | |

MODES FOR CARRYING OUT THE INVENTION

The embodiments of the present invention will be described in details; however the disclosed embodiments are not limited thereto unless they escape from the gist.

Figure 2:
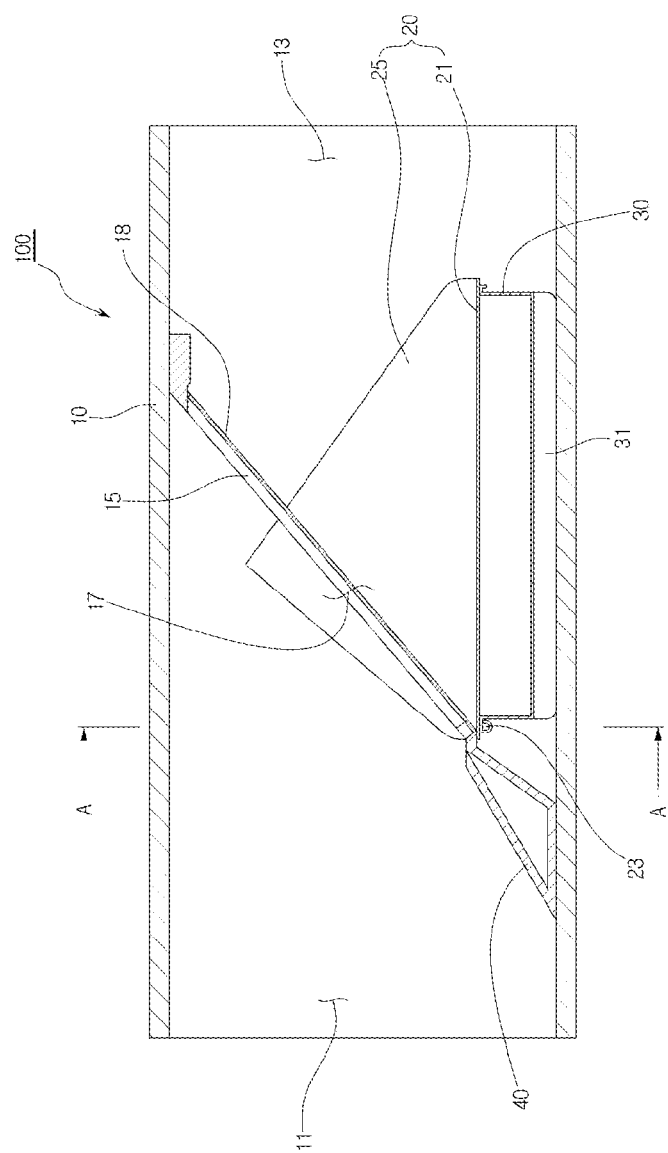
FIG. 2 is a side cross sectional view illustrating construction of an unpowered apparatus for preventing backflow according to the present invention.
Figure 3:
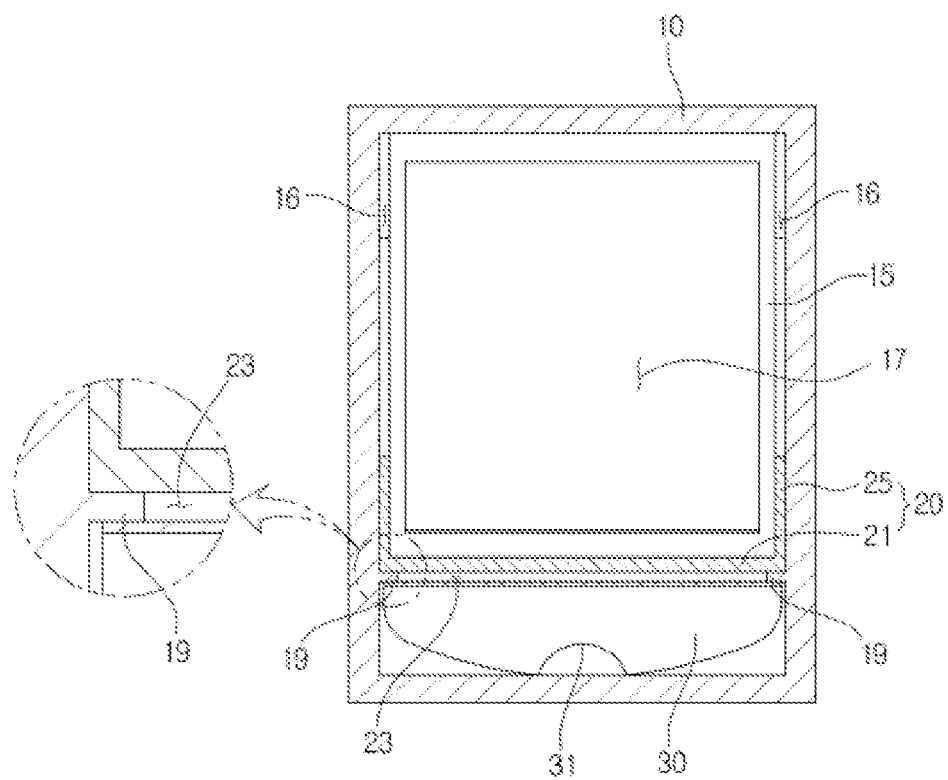
FIG. 3 is a cross sectional view taken along line A-A of FIG. 2 according to the present invention.

FIG. 1 is a perspective view illustrating a construction of an unpowered apparatus for preventing backflow according to the present invention. FIG. 2 is a side cross sectional view illustrating construction of an unpowered apparatus for preventing backflow according to the present invention. FIG. 3 is a cross sectional view taken along line A-A of FIG. 2 according to the present invention.

As shown in FIGS. 1 to 3, the unpowered backflow prevention apparatus 100 according to the present invention comprises a tubular body part 10 through which sewage comes in and goes out, an opening and closing part 20 opening and closing the inner side of the body part 10, a floating part 30 provided at the opening and closing door 20, and a guide 40 guiding the flow of sewage into the body part 10.

The body part 10 is formed in a tubular shape with a quadrangle cross section and is connected with the drain pipe and at one side of which body part 10 is formed an inlet port 11 for receiving sewage from the drain pipe, and at the other side of which body part 10 is formed an outlet port 13 for discharging sewage.

Here, the body part 10 according to the embodiment of the present invention was meant to have a quadrangle cross section, but it might be formed in a tubular shape having a polygonal, circular and elliptical cross section.

At the inner side of the body part 10 is provided a shoulder part 15 which is obliquely installed with respect to the pipe passage and forms a communication port 17 communicating the inlet port 11 and the outlet port 13. In other words, the shoulder part 15 is formed in a quadrangle frame shape and is oblique in an upward direction toward the outlet port 13 of the body part 10, and a gap part 16 with a certain gap is formed between the side walls of both sides of the body part 10 and the frames of both sides of the shoulder part 15, respectively.

The opening and closing door 20 is rotatably provided at an inner side of the body part 10 for the purpose of opening or closing the communication port 17 of the body part 10. In other words, when sewage is discharged via the outlet port 13, the communication port 17 is opened, and when the sewage flows back toward the outlet port 13, the outlet port 13 is closed.

Here, the opening and closing part 20 comprises a door body 21 hinged at an inner side of the body part 10 and a pair of blocking plates 25 which are respectively extended from both sides of the door body 21 for the purpose of blocking between the shoulder part 15 and the inner wall of the body part 10.

At both sides of the door body 21 are formed a hinge hole 23, respectively, and from an inner wall of the body part 10 facing the hinge hole 23 is protruded a hinge shaft 19, respectively, so it is hinged at the hinge hole 23 of the door body 21. So, the door body 21 can rotate about the hinge shaft 19 of the body part 10.

The pair of the blocking plates 25 are upwardly bent from both sides of the door body 21 and come into close contact with the inner wall of the body part 10 and are inserted into the gap part 16 between the shoulder part 15 and the inner wall of the body part 10 and rotate depending on the rotation of the door body 21.

In other words, since the blocking plates 25 are inserted into the gap part 16 as they are coming into close contact with the inner wall of the body part 10, the portions between the shoulder part 15 and the inner wall of the body part 10 are blocked, so it is possible to prevent sand, debris, concomitant, etc. coming in along with sewage via the inlet port 11 of the body part 10 from entering between the door body 21 and the inner wall of the body part 10. If sand, debris, concomitant, etc. gather between the door body 21 and the inner wall of the body part 10, the door body 21 might be an interfering element which interferes with the closing of the communication port 17 of the body part 10.

The floating part 30 is formed in a hollow container shape to float on water and is fixed at a lower side of the opening and closing door 20 and allows the opening and closing door 20 to operate so as to close the communication port 17 by generating buoyancy in the opening and closing door 20 when sewage flows back toward the outlet port 13.

In a state that the opening and closing door 20 is opened, the floating part 30 is supported on the floor of the body part 10, and when sewage flows back via the outlet port 13, the floating part 13 floats on the water surface of sewage came into the outlet port 13, thus lifting upward the opening and closing door 20, so that the opening and closing door 20 upwardly rotate about the hinge shaft 19.

When the amount of sewage flowing back via the outlet port 13 increases, the opening and closing door 20 starts rotating by means of the floating part 30 and comes into close contact with the shoulder part 15 of the body part 10, thus fully closing the communication port 17.

Here, the shoulder part 15 serves to limit the rotation of the opening and closing door 20 so that opening and closing door 20, which has closed the communication port 17, cannot rotate more, and the flown-back sewage is prevented from coming into the gap of the edges of the closed opening and closing door 20.

At this time, when a packing member 18 is attached to the circumferences of the shoulder part 15, it is possible to closely seal between the shoulder part 15 and the opening and closing door 20. In other words, when the communication port 17 is closed as the opening and closing door 20 rotates, the surface of the plate of the opening and closing door 20 comes into close contact with the packing member 18 of the shoulder part 15, so the shoulder part 15 and the opening and closing door 20 are tightly sealed without having any gaps.

A buoyancy detection groove 31 having a semicircular cross section is formed at a lower surface of the floating part 30. As the sewage, which flows back via the outlet port 13, flows into the buoyancy detection groove 31, the floating part 30 can easily float. In other words, when the sewage, which flows back toward the outlet port 13, flows into the buoyancy detection groove 31 of the floating part 30, the floating part 30 comes to have buoyancy and floats on the water surface of sewage.

The guide 40 is disposed between the shoulder part 15 and the bottom surface of the body part 10 for the purpose of guiding the sewage inputted via the inlet port 11 of the body part 10 to flow toward the outlet port 13 via the communication port 17. In addition, it serves to interrupt the sewage inputted via the inlet port 11 from entering into the lower side of the opening and closing door 20, thus preventing the opening and closing door 20 from rotating by means of the floating part 30 at the time of discharging sewage.

The guide 40 also serves to interrupt the sand, debris, concomitant, etc. inputted along with sewage via the inlet port from entering into the lower side of the opening and closing door 20.

The operations of the unpowered apparatus for preventing backflow according to the present invention will be described.

Figure 4:
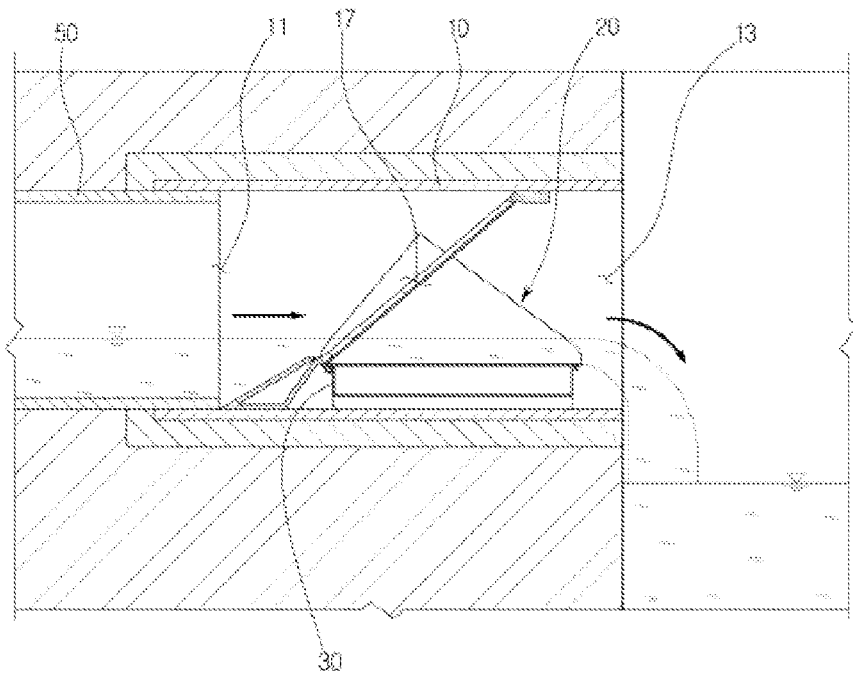
FIGS. 4 to 6 are views illustrating the operation states of an unpowered apparatus for preventing backflow according to the present invention.
Figure 5:
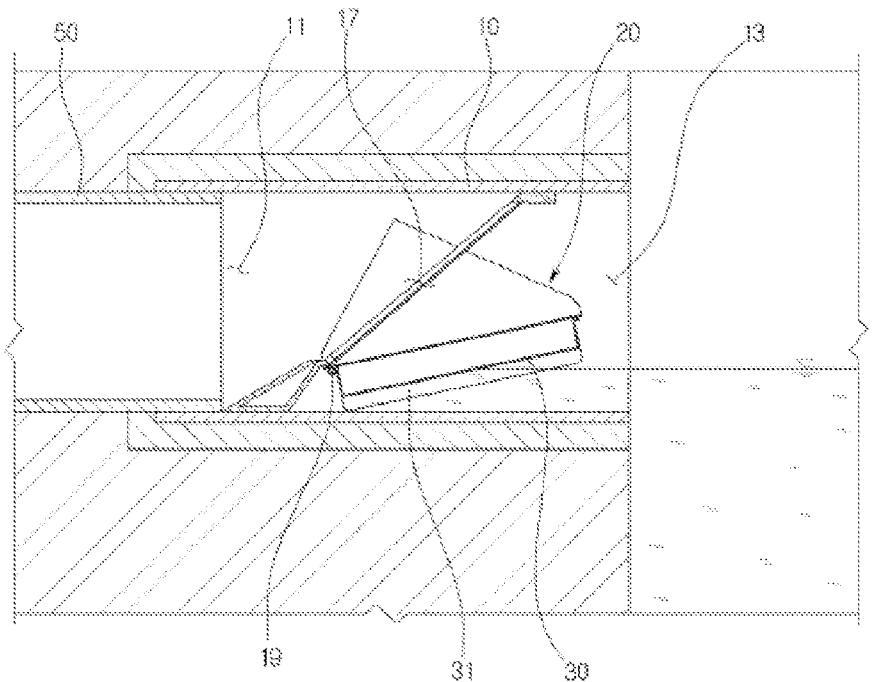
Figure 6:
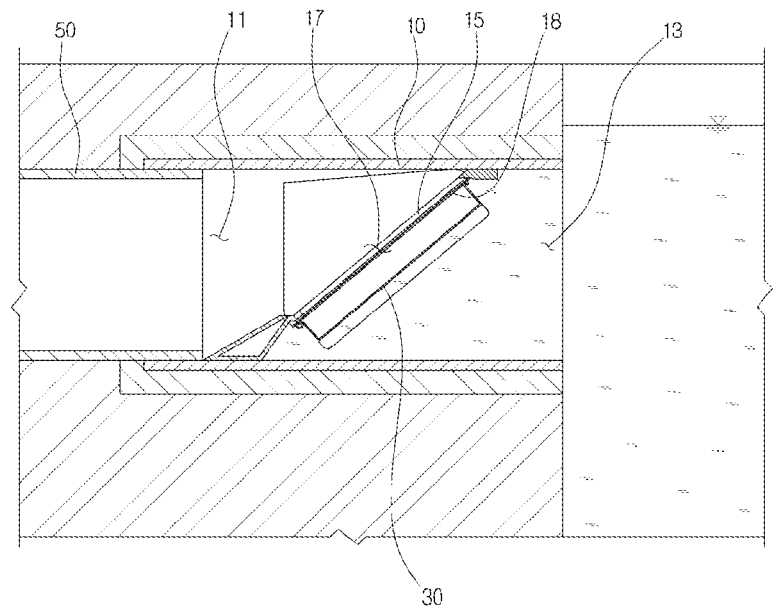

FIGS. 4 to 6 are views illustrating the operation states of an unpowered apparatus for preventing backflow according to the present invention.

The unpowered apparatus 100 for preventing backflow according to the present invention might be preferably installed at a road drainage well, a sewer pipe or a water gate of an agricultural water canal.

As shown in FIG. 4, the unpowered apparatus 100 for preventing backflow is connected at an end portion of the drain pipe 50, so sewage flows from the drain pipe 50 to the inlet port 11 of the body part 10. The introduced sewage is discharged toward the outlet port 13 via the communication port 17 of the inner side of the body part 10.

In other words, when the sewage is inputted from the drain pipe 50 to the inlet port 11 of the body part 10, the opening and closing door 20 opens the communication port 17, and the floating part 30 is supported on the bottom of the body part 10, so the sewage can smoothly flow toward the outlet port 13 via the communication port 17.

In the normal sewage discharge operation state as mentioned above, when the sewage flows back with above a certain water level toward the outlet port 13 of the body part 10 as shown in FIG. 5 for the reasons that a river water floods the drain pipe 50 or the water level of the sea rises, the flown-back sewage gradually flows toward the buoyancy detection groove 31 of the lower side of the floating part 30 via the outlet port 13.

At this time, as the amount of the sewage being introduced into the buoyancy detection groove 31 increases, the floating part 30 floats on the water surface of the sewage, thus lifting upward the opening and closing door 20 and rotating it about the hinge shaft 19 for thereby blocking the sewage which flows back.

As shown in FIG. 6, when the water level of the sewage which flows back via the outlet port 13 of the body part 10 rises, the floating part 30 continuously comes to have buoyancy, so the opening and closing door 20 rotates and comes into close contact with the shoulder part 15 of the body part 10, thus consequently blocking the communication port 17.

At this time, the packing member 18 provided at the circumference of the shoulder part 15 and the surface of the plate of the opening and closing door 20 come into airtight contact, so the sewage, which flows back via the outlet port 13, does not input into the communication port 17.

In a state that the opening and closing door 20 fully blocks the communication port 17, when the water level of the sewage flowing back via the outlet port 13 gradually lowers, the floating part 30 descends, thus allowing the opening and closing door 20 to descend, so that the communication port 17 blocked by means of the opening and closing door 20 gradually opens.

In addition, as the water level of the flowing-back sewage lowers and does not reach the outlet port 13, the buoyancy is not applied of the floating part 30, so the opening and closing door 20 is supported on the bottom of the body part 10, whereby the communication port 17 is fully opened As shown in FIG. 4, the sewage, which was introduced via the drain pipe 50, is discharged via the outlet port 13.

The unpowered apparatus 100 for preventing backflow according to the present embodiment of the present invention has a body part 10 with a quadrangle cross section, but the body part might have a cross section of a polygonal shape, a circular shape or an elliptical shape except for the disclosed body part 10 with a quadrangle cross section. It might comprise an opening and closing door, a floating part and a guide which are formed and operate depending on the body part.

As described above, the unpowered apparatus for preventing backflow according to the present invention is characterized in that the installation of it is easy because it is installed at an end portion of the drain pipe, and it is possible to quickly drain without blocking even when a bulky or long impurity flows in from the drain pipe along with sewage, and when the sewage flows back, the opening and closing door, which is designed to open and close the pipe passage, quickly closes the pipe passage as it operates by means of buoyancy, so it is possible to prevent the flow back of the sewage.

In addition, the gap between the pipe passage and the opening and closing door is blocked in order for the impurity such as sand, debris, concomitant, etc., which flows in from the drain pipe along with sewage, not to interfere with the operations of the opening and closing door, so the error operations do not occur in the opening and closing door, thus enhancing the performance in terms of the prevention of backflow.

The present invention is no limited to the above described embodiments and the attached drawings since it is obvious that an ordinary person skilled in the art the present invention belongs to can amend or modify within the scope of the technical concept of the present invention.

The invention claimed is:

1. An unpowered apparatus for preventing a backflow, comprising:
   a hollow body having an inlet port and an outlet port, the hollow body configured to be disposed in a horizontal manner;
   a shoulder plate disposed within the hollow body configured to tilt relative to a horizontal direction of the hollow body, the shoulder plate having a fluid communication port formed therein to communicate fluid between the inlet port and the outlet port of the hollow body;
   a door hinged-coupled to the hollow body within the hollow body, wherein the door has a door body configured to open or close the fluid communication port via a hinge-movement of the door, and a pair of blocking plates extending vertically from both sides of the door body, respectively, configured to be inserted between inner walls of the hollow body and the shoulder plate; and
   a floating part fixed to a lower face of the door body.

2. The unpowered apparatus for preventing a backflow according to claim 1, further comprising a packing member to seal between the shoulder plate and the door.

3. The unpowered apparatus for preventing a backflow according to claim 1, further comprising a groove formed at a bottom of the floating part.

4. The unpowered apparatus for preventing a backflow according to claim 1, further comprising a fluid guide disposed, at the inlet port, between a bottom of the hollow body and a lower portion of the shoulder plate.

5. The unpowered apparatus for preventing a backflow according to claim 4, wherein the guide has a tilted portion.

6. The unpowered apparatus for preventing a backflow according to claim 1, wherein the shoulder plate tilts toward the outlet port.

\* \* \* \* \*